United States Patent [19]

Essert

[11] Patent Number: 4,526,438

[45] Date of Patent: Jul. 2, 1985

[54] ALIGNMENT SLEEVE FOR FIBER OPTIC CONNECTORS

[75] Inventor: Robert D. Essert, Poughkeepsie, N.Y.

[73] Assignee: Allied Corporation, Morris Township, N.J.

[21] Appl. No.: 494,466

[22] Filed: May 13, 1983

[51] Int. Cl.³ .................................................. G02B 7/26
[52] U.S. Cl. ............................. 350/96.20; 350/96.21
[58] Field of Search ................ 350/96.20, 96.21, 96.22

[56] References Cited

U.S. PATENT DOCUMENTS

| 4,140,366 | 2/1979 | Makuch et al. | 350/96.22 |
| 4,183,619 | 1/1980 | Makuch | 350/96.21 |
| 4,444,461 | 4/1984 | Wey et al. | 350/96.21 |
| 4,461,537 | 7/1984 | Raymer et al. | 350/96.20 |
| 4,461,538 | 7/1984 | Breed et al. | 350/96.20 |

FOREIGN PATENT DOCUMENTS

| 56-67812 | 6/1981 | Japan | 350/96.21 |
| 58-54306 | 3/1983 | Japan | 350/96.20 |

*Primary Examiner*—John Lee
*Attorney, Agent, or Firm*—Roger H. Criss; Roy H. Massengill

[57] ABSTRACT

A resilient alignment sleeve for a fiber optic connector which provides preferential attachment to one of two terminal pins. The sleeve has a relatively thick section extending over about 60 to 70% of the length of the sleeve and a relatively thin section extending over the remainder of the sleeve. The sleeve is retained on the terminal pin which is completely surrounded by the thick section due to increased frictional forces as compared with the thin section.

11 Claims, 3 Drawing Figures

ALIGNMENT SLEEVE FOR FIBER OPTIC CONNECTORS

BACKGROUND OF THE INVENTION

1. Field of the Invention

This invention relates to an alignment sleeve for a fiber otpic connector and connectors incorporating such sleeve.

2. Description of the Prior Art

Precision alignment of one fiber optic cable to another is required to achieve efficient light transfer. This has previously been accomplished in part by providing a tightly fitted tubular sleeve which holds the tips of two mated pins containing the optic fibers in position with one another. To a complish this tight fit, the tubular sleeve is typically made of a resilient thermoplastic material. The pin tips of the two connectors to be mated together are normally identical in shape. A connector assembly utilizing such a resilient sleeve is disclosed, for example, in U.S. Pat. Nos. 4,140,366 and 4,183,619, the disclosures of which are expressly incorporated herein by reference. In using such alignment sleeves, typically the sleeve is placed around the terminal pin of one of the connectors and the terminal pin of the other connector is inserted into the sleeve during mating to provide a properly aligned connection of the two fiber optic cables.

Although the prior art alignment sleeves have worked quite well, one problem that is experienced is when the connectors are demated and then mated again, as occurs when disconnecting and connecting the fiber optic lines. When the connectors are demated, the resilient sleeve remains attached by friction to one of the terminal pins of the connector. Since the pins are identical in design, nothing predetermines to which pin the sleeve will remain attached. As a result, when a connector is remated with another connector, it may be incorrectly assumed that a sleeve is or is not attached to a pin. Thus, what may occur is the accidental insertion of two sleeves into a connector body which would likely damage the sleeve and impair the alignment, or the accidental omission of a sleeve which would likewise impair the alignment.

It would be desirable to provide a means for eliminating the above mentioned problem.

SUMMARY OF THE INVENTION

In accordance with this invention, there is provided an alignment sleeve for a fiber optic connector having a terminal pin adapted for receiving an optical fiber, the sleeve comprising:

a resilient tubular body having openings at both ends thereof and adapted to be fitted over the terminal pin, the tubular body having a first section of a first thickness extending over a portion of the length of the body and a second section having a thickness less than the first thickness, the second section extending over the remaining length of the body, the length of the first section being greater than the length of the pin when the tubular body is fitted over the pin.

As a result, the thicker portion of the tubular body extends over the entire length of the terminal pin and when the fiber optic connector is mated with another fiber optic connector having a similar terminal pin, such terminal pin is covered by both the thick and thin sections of the sleeve. When such connectors are demated, the sleeve will remain attached to the first pin (about which the thicker portion of the sleeve completely extends) rather than the second pin. This is due to the greater frictional force exerted by the thicker section on the first pin. Consequently, the attachment of the sleeve to a pin is preferential and as a result the problems of the prior art are avoided.

Also in accordance with this invention, there is provided an alignment sleeve for a fiber optic connector having a first terminal pin adapted for receiving a first optical fiber, the first optical connector being adapted to mate with a second fiber optic connector having a second optical fiber, the sleeve comprising:

a resilient tubular body having openings at both ends thereof and adapted to be fitted over the first terminal pin and the second terminal pin, the tubular body having a first portion of a first thickness extending over a portion of the length of the body and a second portion having a thickness less than the first thickness, the second portion extending over the remaining length of the body, the length of the first portion being greater than the length of the first pin when the tubular body is fitted over the first pin such that when the sleeve is fitted over the second terminal pin, the second portion of the tubular body extends over the second terminal pin.

DESCRIPTION OF THE PREFERRED EMBODIMENTS

Figure 1:
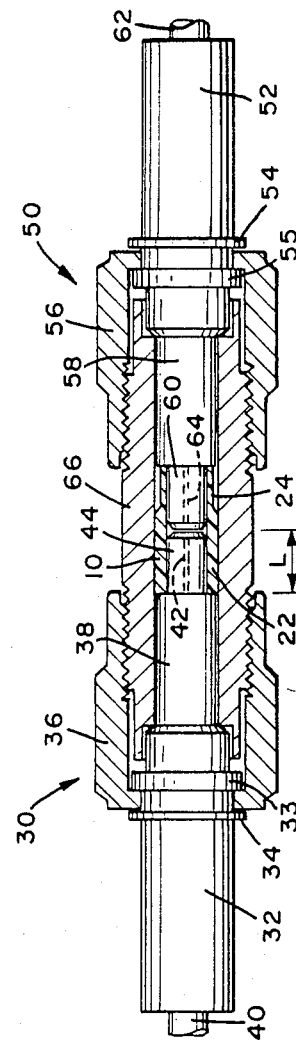
FIG. 1 is an enlarged cross-sectional view of a sleeve embodying the present invention.

With reference to FIG. 1, there is shown an alignment sleeve, generally indicated at 10, which has a substantially cylindrical body 12 having openings 14 and 16 at ends 18, 20 for insertion of terminal pins as described below. Ends 18, 20 are preferably tapered inwardly to assist in the entry of the pins. Sleeve 10 is formed from a resilient material, preferably a thermoplastic resin. The presently preferred plastic is an acetal resin.

Sleeve 10 includes a first relatively thick section 22 having a first thickness $T_1$ and a second relatively thin section 24 having a second thickness $T_2$. The transition between sections 22 and 24 may be formed by a tapered portion 26 or by an abrupt decrease in the thickness (not shown). The thickness $T_2$ is preferably about 50 to 80 percent, more preferably about 65 to 75 percent, of the thickness $T_1$. The relatively thick section 22 extends approximately 60 to 70% of the length L of sleeve 10. The midpoint of sleeve 10 is indicated at L/2. Preferably, the thickness $T_1$ and $T_2$ are substantially constant over the entire sections 22 and 24, respectively.

Figure 3:
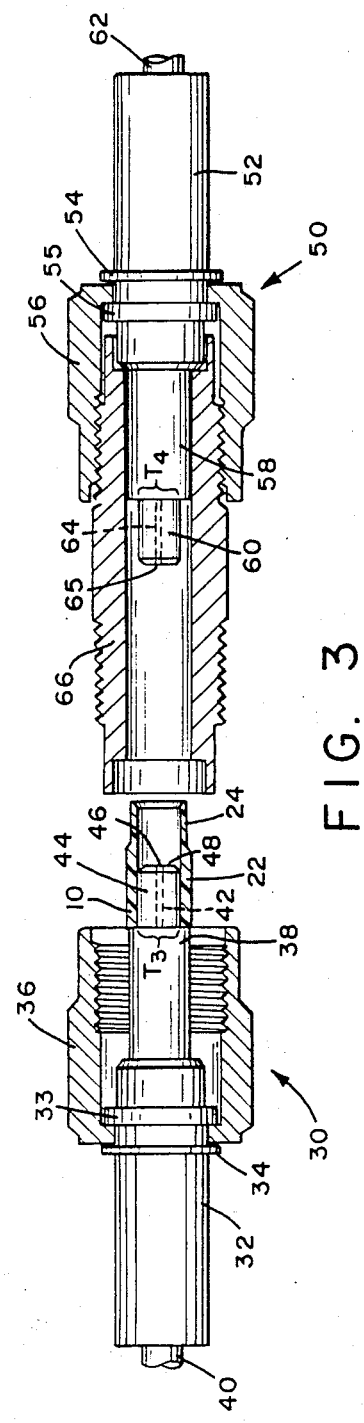
FIG. 3 is an enlarged cross-sectional view of the connectors of FIG. 2 in the demated state.

FIG. 3 depicts two fiber optic connectors in a demated condition. A first connector 30 includes a housing having a rear body portion 32 including an annular slot for receiving a retaining ring 34. The retaining ring and an annular flange 33 co-act to confine a coupling nut 36 to the forward end of rear body portion 32. The rear body portion 32 and front body portion 38 have a central opening. A first fiber optic cable 40 extends through the opening in rear body portion 32. A ferrule (not shown for sake of clarity) typically extends over rear body portion 32 and clamps the cable 40 to body portion 32. A heat shrink tubing (also not shown) extends over the ferrule. As is generally the case, the front body portion 38 has an opening which is reduced in size and which receives the forward end of the optical fiber 42 after the cladding and other layers have been stripped from the cable 40 in a normal fashion prior to connection. Front body portion 38 terminates in a first terminal pin 44 having a predetermined thickness $T_3$. Pin 44 has a reduced diameter as compared with the rest of the forward body portion 38. An opening 46 in the forward end 48 of pin 44 receives the end of fiber 42, which is precisely aligned in the center of pin 44. For this purpose, alignment inserts or pins may be used or a precise hole drilled in the forward end 48 as is known. See the aforementioned U.S. Pat. No. 4,140,366.

Sleeve 10 is fitted over pin 44 with the thicker section 22 completely extending over the length of pin 44 and beyond. Obviously, sleeve 10 can be reversed end to end, with the thinner section 24 extending over pin 44. Coupling nut 36 has internal threads as is conventional for coupling with a second connector 50.

Second connector 50 is preferably identical to first connector 30 and includes a rear body portion 52 likewise having a retaining ring 54 and flange 55 for coupling nut 56 and a front body portion 58 terminating in a second terminal pin 60. A second fiber optic cable 62 extends through an opening in the rear body portion 52, with the forward end of the optical fiber 64 extending through an opening 65 in terminal pin 60 in a manner similar to that described with respect to first pin 44. Again, only the optical fiber extends through pin 60, as the other layers have been similarly removed. Also for sake of clarity, the ferrule and heat shrink tubing are not shown. Second pin 60 is surrounded in the mated condition (FIG. 2) by the opposite end of sleeve 10, such that the thinner section 24 extends part way along the length of pin 60 and a portion of the thicker section 22 extends the rest of the way. The thickness $T_4$ of pin 60 is equal to the thickness $T_3$ of pin 44.

A cylindrical adapter 66 is provided which extends over the front body portion of both connectors 30 and 50 in the mated condition. Adapter 66 has external threads adjacent its two ends for coupling with the internal threads of coupling nuts 36, 56 in a known fashion.

Figure 2:
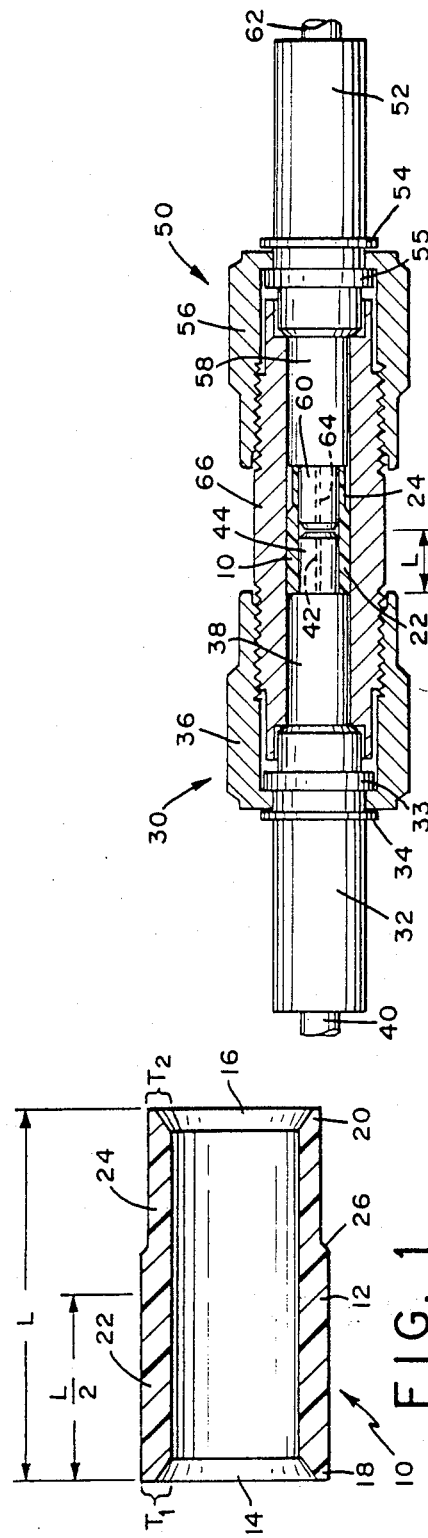
FIG. 2 is an enlarged cross-sectional view of a mated pair of fiber optic connectors including the sleeve of the present invention.

As can be seen from the mated condition of FIG. 2, the optical interface of pins 44 and 60 is at the midpoint of sleeve 10, with the pins being slightly spaced from each other in an known fashion to prevent scratching of the end faces of the optical fibers. The thicknesses $T_3$ and $T_4$ of the pins are chosen such that they are equal to or slightly larger than the internal diameter of sleeve 10, with the result that sleeve 10 is tightly fitted over pins 44 and 60.

Now, when connectors 30 and 50 are to be demated, either coupling nut 36 or 56 is loosened and its associated pin is removed from adapter 66. As is shown in FIG. 3, sleeve 10 is retained on pin 44, that is, the pin which is completely surrounded by thicker portion 22. The reason for this is that the frictional force holding sleeve 10 on pin 44 is greater than the frictional force holding sleeve 10 on pin 60, due to the differences in the thickness of the sleeve, and this lesser force releases the sleeve.

As a result, the location of the resilient alignment sleeve on one pin or the other is predetermined by which side of the sleeve is fitted over which pin. Thus, the problems referred to above when connectors 30 and 50 are remated or mated with other connectors can be eliminated.

In one presently preferred embodiment, typical dimensions for sleeve 10 are as follows: length—0.244 inch (6.1 mm), length of thick section 22—0.150 inch (3.75 mm), length of thin section 24—0.094 inch (2.35 mm), $T_1 = 0.02$ inch (0.5 mm), $T_2 = 0.014$ inch (0.35 mm) and inside diameter = 0.084 inch (2.1 mm).

I claim:

1. An alignment sleeve for a fiber optic connector having a terminal pin adapted for receiving an optical fiber, said sleeve comprising:

a resilient tubular body having openings at both ends thereof and adapted to be fitted over said terminal pin, said tubular body having a first section of a first thickness extending over a portion of the length of said body and a second section having a thickness less than said first thickness, said second section extending over the remaining length of said body, the length of said first section being greater than the length of said pin when said tubular body is fitted over said pin.

2. The alignment sleeve of claim 1 wherein said first section extends about 60 to 70 percent of the length of said body.

3. The alignment sleeve of claim 2 wherein said thickness of said second section is about 50 to 80 percent of the thickness of said first section.

4. The alignment sleeve of claim 1 wherein said thickness of said second section is about 50 to 80 percent of the thickness of said first section.

5. The alignment sleeve of claim 1 wherein said resilient tubular body is formed from an acetal resin.

6. The alignment sleeve of claim 1 wherein said tubular body is formed from a plastic material.

7. An alignment sleeve for a fiber optic connector having a first terminal pin adapted for receiving a first optical fiber, said optical connector being adapted to mate with a second fiber optic connector having a second terminal pin adapted for receiving a second optical fiber, said sleeve comprising:

a resilient tubular body having openings at both ends thereof and adapted to be fitted over said first terminal pin and said second terminal pin, said tubular body having a first portion of a first thickness extending over a portion of the length of said body and a second portion having a second thickness less than said first thickness, said second portion extending over the remaining length of said body, the length of said first portion being greater than the length of said first pin when said tubular body is fitted over said first pin such that when said sleeve is fitted over said second terminal pin, said second portion of said tubular body and a portion of said first portion of said tubular body extends over said second terminal pin.

8. The alignment sleeve of claim 7 wherein said first portion extends about 60 to 70 percent of the length of said body.

9. The alignment sleeve of claim 8 wherein the thickness of said second portion is about 50 to 80 percent of the thickness of said first portion.

10. The alignment sleeve of claim 7 wherein said first thickness and said second thickness are substantially constant over the entire length of said first and second portions, respectively.

11. The alignment sleeve of claim 7 wherein said tubular body is formed from a plastic material.

* * * * *